July 7, 1931.  A. J. PETERMAN  1,813,315
ROLLER BEARING CONSTRUCTION
Filed Sept. 9, 1929
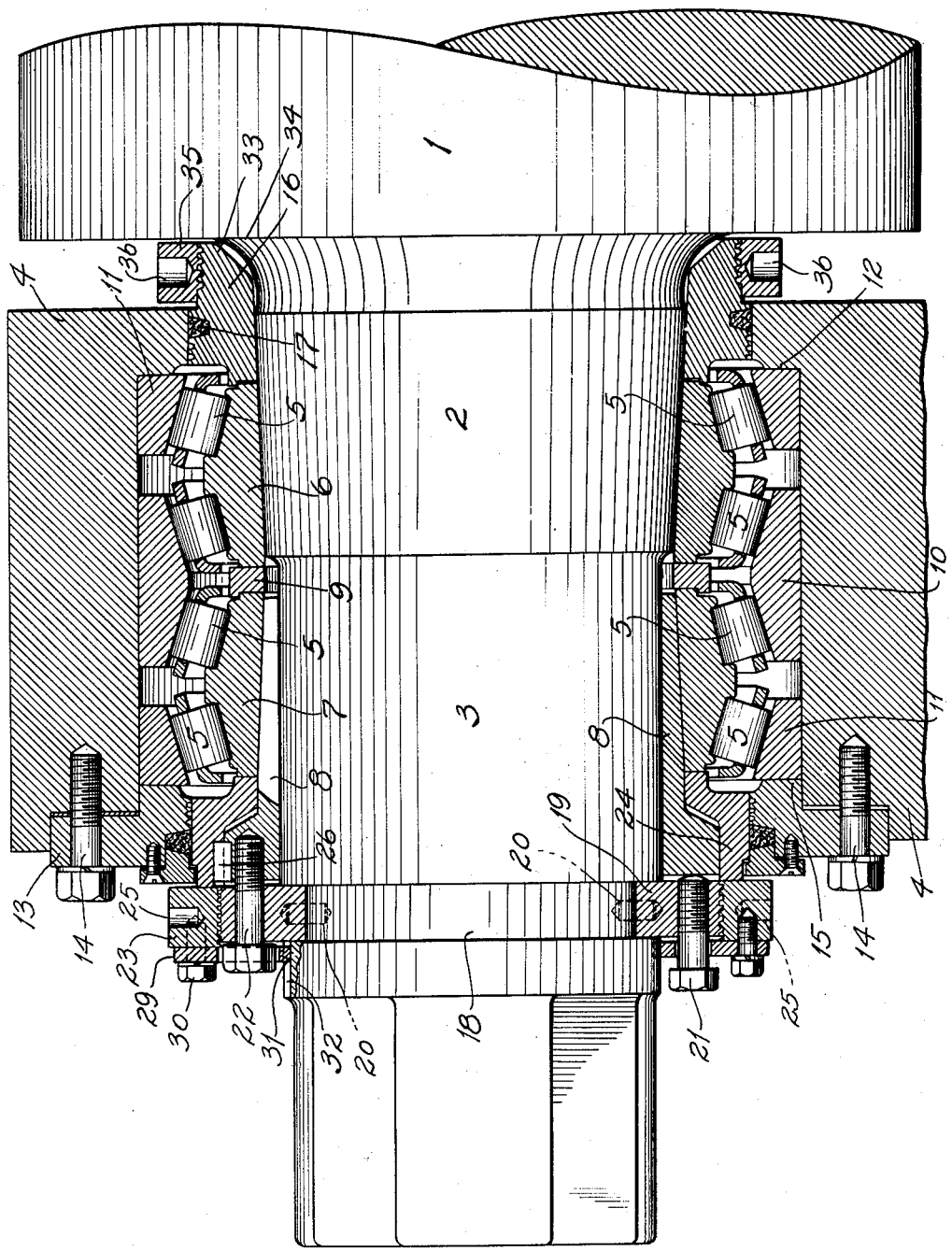
INVENTOR:
Albert J. Peterman,
by Carr, Carr & Gravely,
HIS ATTORNEYS Patented July 7, 1931

1,813,315

UNITED STATES PATENT OFFICE

ALBERT J. PETERMAN, OF CANTON, OHIO, ASSIGNOR TO THE TIMKEN ROLLER BEARING COMPANY, OF CANTON, OHIO, A CORPORATION OF OHIO

ROLLER BEARING CONSTRUCTION

Application filed September 9, 1929. Serial No. 391,225.

This invention relates to roller bearing constructions, particularly to roller bearing constructions for the rolls or rolling mills, where it is necessary to mount the inner raceway members of the roller bearings tight on the rolls in order to prevent creeping of said raceway members on said rolls. The principal object of the present invention is to equip such roller bearing constructions with simple and efficient means for quickly and easily loosening the tight fitting inner raceway members thereof without damage to the rolls or bearings. The invention consists in the bearing loosening means, and in the construction, combinations and arrangements of parts hereinafter described and claimed.

The accompanying drawing, which forms part of this specification, is a vertical longitudinal section of a portion of an antifrictionally mounted rolling mill roll provided with raceway loosening means embodying my invention.

Referring to the accompanying drawing, my invention is shown in connection with an antifrictionally mounted mill roll 1 having a neck portion comprising a reduced tapering inner end portion 2 and a further reduced cylindrical outer end portion 3 that extends into an opening provided therefor in the standard or end frame 4 of the rolling mill. In the construction illustrated, there are four series of taper rollers 5 on the roll neck. The four series are arranged in two groups of two series each, the innermost group being provided with a common cone or inner raceway member 6, and the outermost group being provided with a common cone or inner raceway member 7. The innermost cone 6 is mounted tight on the reduced tapering inner end portion 2 of the roll neck; and the outermost cone 7 is mounted loosely on the cylindrical outer end portion 3 of said roll neck. The outermost cone 7 is provided with a conical bore, which is of larger diameter at the outermost end of the cone than at the innermost end thereof and is adapted to receive an externally conical split sleeve 8 that is slidably mounted on the reduced cylindrical portion 3 of the roll neck. The cones 6 and 7 are doubly coned to provide raceways for the four series of taper rollers 5 and are spaced apart the desired distance by a spacer ring 9. A doubly conical cup or outer raceway member 10 is mounted in the roll neck receiving opening of the frame or standard 4 of the mill to cooperate with the two middle series of taper rollers; and single cups 11 are likewise mounted in said opening for cooperation respectively, with the two endmost series of bearing rollers.

At the innermost end of the bearing receiving opening in the frame or standard 4 of the mill is an annular shoulder 12 against which the innermost cup 11 abuts; and at the outermost end of said bearing receiving opening is a ring 13 that is secured to the outer face of said frame or standard by screws 14 and has an annular rib 15 abutting against the outermost bearing cup. The annular space between the innermost end of the roll neck and the bearing receiving opening in the standard of the mill is closed by means of a closure ring 16 which is sleeved on the reduced tapering portion 2 of the roll neck. Said ring is provided with a packing 17.

Mounted in an annular groove 18 located in the reduced cylindrical portion 3 of the roll neck adjacent to the outer end of the split conical sleeve 8 is a two-piece externally threaded ring or collar 19 that is secured to the roll neck for rotation therewith by means of dowel pins 20. Cap screws 21 are threaded through the collar 19 on the roll neck with their inner ends in abutting relation to the outer end of the split conical sleeve 8, thereby permitting said sleeve to be forced inwardly into the tapered bore of the outer cone 7 when said cap screws are tightened. Cap screws 22 extend loosely through holes provided therefor in the externally threaded collar 19 of the roll neck and are threaded into the end of the split conical sleeve 8, whereby tightening of these screws operates to loosen or withdraw the said sleeve from the conical bore of the outer cone 7.

Threaded on the externally threaded collar 19 of the roll neck is an internally threaded ring 23, whose inner face abuts against the outer end of a spacing sleeve 24 sleeved on the split conical sleeve 8 between the ring 23 and the outer end of the outer bearing cone 7. The ring 23 is provided in its peripheral surface with radial holes 25 for cooperation with a pin wrench, whereby said ring may be adjusted to press against the outer end of the spacing sleeve 24, which pressure is transmitted through said sleeve and the outer bearing cone 7 and spacing ring 9 to the inner bearing cone 6 to firmly seat the same on the reduced tapering portion 2 of the roll neck. The spacing sleeve 24 is held against rotation on the split conical sleeve 8 by means of a key 26 which seats in keyways provided therefor in the respective sleeves. The cone adjusting ring 19 is locked in the desired adjusted position by means of an annular plate 29, which is secured flatwise to the outer face of said ring by a series of cap screws 30 and has a detent or lug 31 in its inner periphery that seats in a longitudinal groove 32 provided therefor in the roll neck. The annular ring locking plate 29 is provided with openings adapted to accommodate the head of the adjusting screws 21 and 22 for the split clamping sleeve 8 for the outer cone 7.

The closure ring 16 at the innermost end of the bearing is slidably mounted on the reduced tapering portion 2 of the mill roll neck, with its outermost end in abutting relation to the adjacent end of the innermost bearing cone 6. The end 33 of said ring 16 projects beyond the face of the standard 4, terminating adjacent to a shoulder 34 formed by the large body portion of the roll. The end portion 33 of said ring 16 is threaded to receive an interiorly threaded sleeve or nut 35 that is provided with holes 36 to cooperate with a wrench. With this arrangement, when it is desired to remove the tight fitting inner cone 6 from the roll neck the nut is rotated in a direction that will cause it to engage the adjacent end face or shoulder 34 of the roll, after which the reaction forces said ring 16 against the inner end of said inner bearing cone and thus loosens or unseats the same from the tapered portion of the roll neck. In the particular construction shown, it is, of course, necessary to remove the outer bearing parts and the adjusting and securing devices therefor before the inner bearing cone is loosened. The thread of each nut should be of the hand that will cause the nut to screw onto the ring 16 (away from the roll) when the roll rotates in its normal direction.

It is obvious that the above described construction permits the removal of bearing cones that are pressed on mill rolls or shafts with sufficient firmness to resist the heavy end thrusts to which they are subject in practice. It is simple and inexpensive and permits the cones to be quickly and easily removed without the use of separate pulling devices which are difficult to apply and operate and are liable to damage the cones.

Obviously, the hereinbefore described invention admits of considerable modification, and I do not wish to be limited to the precise construction shown and described.

What I claim is:

A roller bearing rolling mill construction comprising a frame having an opening therein, a roll having a reduced tapering neck portion extending into said opening and forming a shoulder on said roll adjacent to said opening, a roller bearing interposed between said roll neck and said frame with its inner raceway member tight on said tapering roll neck, a closure ring for said frame opening, said ring being in abutting relation to said inner raceway member and projecting beyond said frame towards said shoulder, said projecting portion being externally threaded and a nut on said threaded portion for reacting against said shoulder to loosen said inner raceway member from said roll neck.

Signed at Canton, Ohio, this 21 day of Aug. 1929.

ALBERT J. PETERMAN.